United States Patent [19]

Morita

[11] 4,450,616
[45] May 29, 1984

[54] METHOD OF ENSURING THE TIGHTNESS OF A BOLT AND A NUT

[75] Inventor: Kiyoshi Morita, Kyoto, Japan

[73] Assignee: Yamashina Seiko-Sho, Ltd., Japan

[21] Appl. No.: 393,336

[22] Filed: Jun. 29, 1982

[30] Foreign Application Priority Data

Jul. 3, 1981 [JP] Japan .................... 56-104893

[51] Int. Cl.³ .......................................... B23P 11/00
[52] U.S. Cl. ........................ 29/446; 10/86 B;
10/155 R; 72/364; 72/700; 148/402
[58] Field of Search .................. 10/27 R, 27 H, 86 B,
10/155 R, 155 A; 29/446, 447, 452; 72/364,
700; 148/11.5 R, 11.5 A, 11.5 C, 402; 411/10,
11, 533, 544

[56] References Cited

U.S. PATENT DOCUMENTS

| 3,832,243 | 8/1974 | Donkersloot et al. ............. | 148/402 |
| 3,922,974 | 11/1976 | Miki et al. ........................ | 411/544 |
| 4,019,925 | 4/1977 | Nenno et al. ................ | 148/402 X |
| 4,149,911 | 4/1979 | Clabburn ..................... | 148/402 X |

FOREIGN PATENT DOCUMENTS

| 52-9757 | 1/1977 | Japan .................................... | 411/10 |
| 52-37658 | 3/1977 | Japan .................................... | 411/11 |
| 52-63547 | 5/1977 | Japan .................................... | 411/11 |

Primary Examiner—E. Michael Combs
Attorney, Agent, or Firm—Wigman & Cohen

[57] ABSTRACT

The disclosure relates to a method of insuring the tightness of a fastener including forming a three-dimensional annular member in an austenite phase using a press, cooling the annular member to a temperature lower than the temperature for starting an austenite transformation, fastening the fastener with the annular member to flatten the annular member, and returning the temperature of the annular member to a higher than austenite temperature so that the recovery power of the annular member for returning the annular member to the three-dimensional shape in the austenite phase generates a fastening force for the fastener.

2 Claims, 7 Drawing Figures

METHOD OF ENSURING THE TIGHTNESS OF A BOLT AND A NUT

BACKGROUND OF THE INVENTION

1. Field of the Invention

The present invention relates generally to a washer for preventing the loosening of a bolt, nut etc. and more particularly, relates to an elastic washer consisting of a shape memory alloy.

2. Description of the Prior Art

Conventional, elastic washers, such as spring washers, countersunk spring washers and toothed washers are used with bolts and nuts in order to ensure tightness. However, conventional elastic washers have insufficient flexure, and accordingly, they have a tendency to loose elasticity over a period of time.

In an attempt at improving this situation numerous methods have been proposed for fastening bolts and nuts. Examples of these prior art attempts include a torque method of a nut rotation angle method which simply rotats and fastens the bolt or nut; a tension method which retains a bolt in an extending condition within the elasticity limit and fastens a nut; and a shrinkage fit method which preheats a bolt, and retains it under expanded conditions and then fastens a nut. The torque method and a nut rotation angle method are unsatisfactory because the frictional stress in the threaded surface increases with the fastening of the bolt, and the bolt must be tighten by an excessive torsional moment. The tension method and shrinkage fit method are unsatisfactory because an additional device is required and their application is limited. Furthermore, in the shrinkage fit method, the heating of the bolt beyond a suitable temperature range exerts a detrimental influence upon the metallurgical properties and surface treatment of the bolt.

SUMMARY AND OBJECTS OF THE INVENTION

It is a general object of the present invention to provide an improved member for ensuring the tightness of a bolt or nut which obviates the problems noted above.

Another object of the present invention is the provision of a washer which can obtain a high degree of tightness without a loss of elasticity.

A further object of the present invention is to provide an elastic washer which permits a bolt or a nut to be fastened easily and tightly without providing an excessive torsional moment and can obtain a large fastening function after fastening.

A still further object of the present invention is to provide an elastic washer to fasten a bolt or a nut similarly to the tension method without a previous tension.

In a preferred embodiment to be hereinafter described in greater detail, these as well as other objects and advantages are achieved by providing an elastic washer being made of a shape memory alloy. The elastic washer is formed three-dimensionally in the original phase. Then, the elastic washer is cooled to a suitable temperature lower than the As-point (the temperature for starting the austenite transformation) for easy deformation and a bolt and/or a nut is fastened with the elastic washer using a torque as set in a lower level which flattens the elastic washer. After the temperature of the elastic washer has been returned to a temperature higher than the Af-point (autenite transformation temperature), the recovery power of the washer for returning to the shape in its original phase generates a fastening force for the bolt and/or nut.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
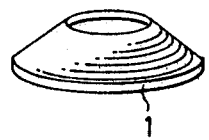
FIG. 1 is a drawing showing a perspective view the elastic washer of the present invention.

Referring now in detail to the drawings wherein like parts are designated by like reference numerals throughout, in FIG. 1 there is shown an elastic washer 1 made of a shape memory alloy according to the present invention. The shape memory alloys have the status of the austenite or matrix phase at an ambient temperature, for example, such as Cu-Zn-Al alloy and the washer has a sunk-head shape or flat dish shape, as shown in FIG. 1.

Generally, when the shape memory alloy is applied with a stress at a temperature lower than the As-point or the temperature for starting the austenite transformation, it deforms plastically easily. However, when the shape memory alloy is heated to a temperature higher than the austenite transformation temperature of the Af-point (in the case of this alloy for the present embodiment, the Af-point is $-100°$ C.), martensite is transformed back to the original phase and at the same time the shape of the shape memory alloy returns to the status of the original phase or the status before transformation. This phenomenon is well known as the shape memory effect in a shape memory alloy.

Figure 4:
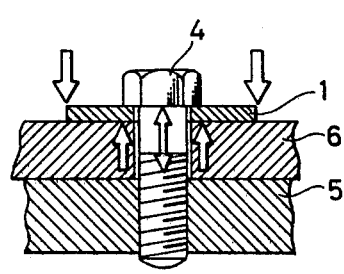
FIG. 4 is a drawing of a cross sectional view showing the conditions of the washer of the present invention.

The elastic washer 1 uses the advantage of such shape memory effect. More particularly, described, the elastic washer 1 formed three-dimensionally in the original phase is cooled to a suitable temperature, lower than the As-point for easy deformation. A bolt and nut set is fastened using a torque as set in a lower level to a degree which flattens the elastic washer 1. Then, the temperature of the elastic washer 1 returns to a temperature higher than the Af-point, and the recovery power of the washer for returning to the shape in the original phase generates the required fastening force for the bolt, as shown in FIG. 4.

Figure 2:
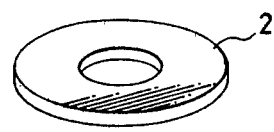
FIG. 2 is a drawing of a perspective view showing the status of a material for the elastic washer.
Figure 3:
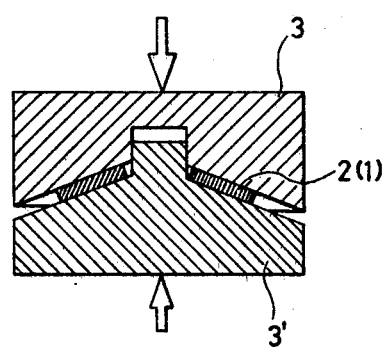
FIG. 3 is a drawing of a cross-sectional view showing the preparatory process of the elastic washer.

A process for preparing the elastic washer 1 is described hereinafter. In FIG. 2, an annular member 2 is punched out of a plate of the shape memory alloy. As shown in FIG. 3, when the annular member 2 is compressed and retained between a press means, for example, an upper platen 3 and a lower platen 3', at for example 200° C. for 30 minutes under a work load, the dish shape as shown in FIG. 1 is memorized as the shape of the annular member in the original phase.

Even if the elastic washer 1 is employed as a common sunkhead spring washer, it is rendered effective as a locking washer by both the stress-provoking martensite transformation and the elasticity due to the return transformation.

A further excellent property of the elastic washer for ensuring the tightness of a bolt is obtained by the following process. The elastic washer 1 is cooled to −150° C., that is, lower than a Mf-point (a martensite transformation finishing temperature with liquid nitrogen, by which the phase transforms completely to the martensite phase, and the washer is easily deformed due to the displacement of the boundary between the interphase twin-crystalline forms or sprouted crystals. As shown in FIG. 4, when the member 6 is fixed to the fastening member 5 with a bolt 4 after the cooled elastic washer 1 is inserted between the bolt 4 and the member 6, the elastic washer 1 is transformed to a plane form by a fastening torque at a lower level than the ordinary fastening torque for the bolt 4. When the flattened elastic washer 1 comes into facial contact with the member 6 to be fastened, the temperature of the elastic washer 1 rises by the heat conducted from the bolt 4 or from the member 6. Thus when it reaches a temperature higher than the Af-point (−100° C.), the elastic washer 1 tends to return to the dish-like form in the original phase. Therefore, the washer pushes the seating plane of the bolt 4 to ensure the tightness of the bolt 4. Since the recovering power is variable depending upon the component, dimension, shape and memory-treating conditions etc. of the elastic washer 1, the suitable control of these factors, cooling conditions and initial fastening torque permit the generation of a suitable fastening power depending upon the size and strength of the bolt 4.

Figure 5:
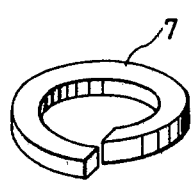
FIG. 5 is a drawing showing a perspective view of a spring washer of a second embodiment of the present invention.
Figure 6:
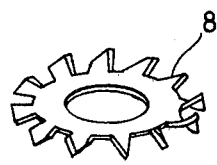
FIG. 6 is a perspective drawing showing a view of threaded washer of a third embodiment of the present invention.
Figure 7:
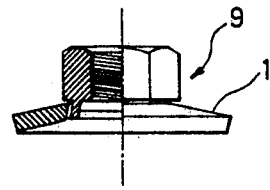
FIG. 7 is a drawing showing a plan view of the status of fixture to the nut partially showing the cross section thereof.

The present invention is not limited to the above mentioned embodiment, therefore the annular shape memorial alloy member may be formed for a spring washer 7 or a toothed washer 8 as shown in FIGS. 5 and 6. As shown in FIG. 7, when the elastic washer uses the advantage of a conventional technique for incorporating a washer 6 with a nut to make a washer-associated nut 9, the elastic washer 1 can be cooled together with the nut 9 so that the heat capacity is increased, therefore the temperature rise of the washer during the fastening operation is decreased in order to facilitate the fastening operation.

It will be evident from the description of the foregoing embodiment that the elastic washer of the present invention is obtained by taking advantage of the shape variation due to the phase transmutation of the shape memorial alloy so that even the apparent plastic region may be utilized as the elastic region and therefore the washer has a very large flexure-recovering quantity without a loss of elasticity to provide the stable effect of checking slackness.

Moreover, the elastic washer effectively ensures the tightness of a bolt and a nut by the above mentioned process for cooling the elastic washer without creating a shearing stress due to the torsion of the bolt. Its ensuring effect does not depend upon the friction coefficient of the seating plane and screw-fastening surface.

Although a only preferred form of the present invention has been illustrated and described, it should be understood that the device is capable of modification by one skilled in the art without departing from the principles of the invention. Accordingly, the scope of the invention is to be limited only by the claim appended hereto.

I claim:

1. A method of ensuring the tightness of a fastener comprising:
    forming a three-dimensional shape memory annular member in an austenite phase using press means;
    cooling the annular member to a temperature lower than the temperature for starting an austenite transformation for easy deformation;
    fastening the fastener with the annular member using a lower-than-conventional torque to a degree which flattens the annular member; and
    returning the temperature of the annular member to higher than an austenite transformation temperature, so that the recovery power of the annular member for returning the annular member to the three-dimensional shape in the austenite phase generates a fastening force for the fastener.

2. The method of claim 1, wherein said fastener comprises a bolt and a nut.

* * * * *